United States Patent [19]

Shoemaker

[11] 4,186,986

[45] Feb. 5, 1980

[54] SEALED SPLICE

[75] Inventor: John R. Shoemaker, Reidsville, N.C.

[73] Assignee: AMP Incorporated, Harrisburg, Pa.

[21] Appl. No.: 961,302

[22] Filed: Nov. 16, 1978

[51] Int. Cl.$^2$ ............................................... H01R 3/02
[52] U.S. Cl. ...................................... 339/114; 339/96; 339/117 R
[58] Field of Search ........... 339/114, 94 C, 96, 115 R, 339/115 C, 116 R, 116 C, 117 R, 117 P

[56] References Cited

U.S. PATENT DOCUMENTS

| | | | |
|---|---|---|---|
| 2,736,871 | 2/1956 | Bales | 339/94 C |
| 3,115,380 | 12/1963 | Kuehl et al. | 339/117 P |
| 4,114,974 | 9/1978 | Lawrence | 339/94 C X |

Primary Examiner—Roy Lake
Assistant Examiner—DeWalden W. Jones
Attorney, Agent, or Firm—Gerald K. Kita

[57] ABSTRACT

An electrical connector is disclosed of the type for sealably protecting an electrical splice particularly for buried wires. The connector has a shell for containing the spliced wires to be protected. The shell further contains a volumetrically collapsable container filled with a viscous sealant material. A closure cap is closed compressibly over the container, collapsing the same and expelling and distributing the sealant throughout the connector shell.

4 Claims, 9 Drawing Figures

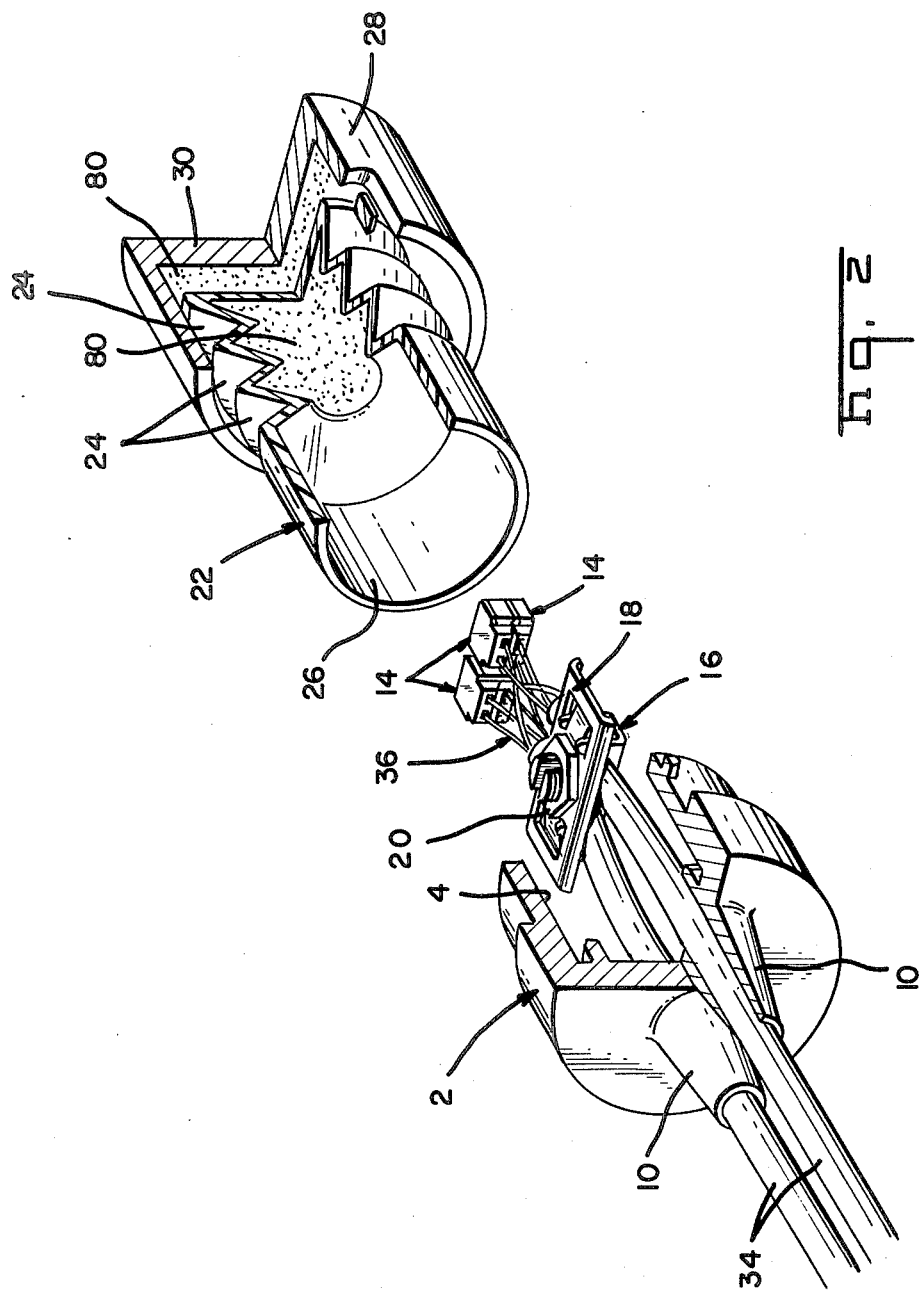

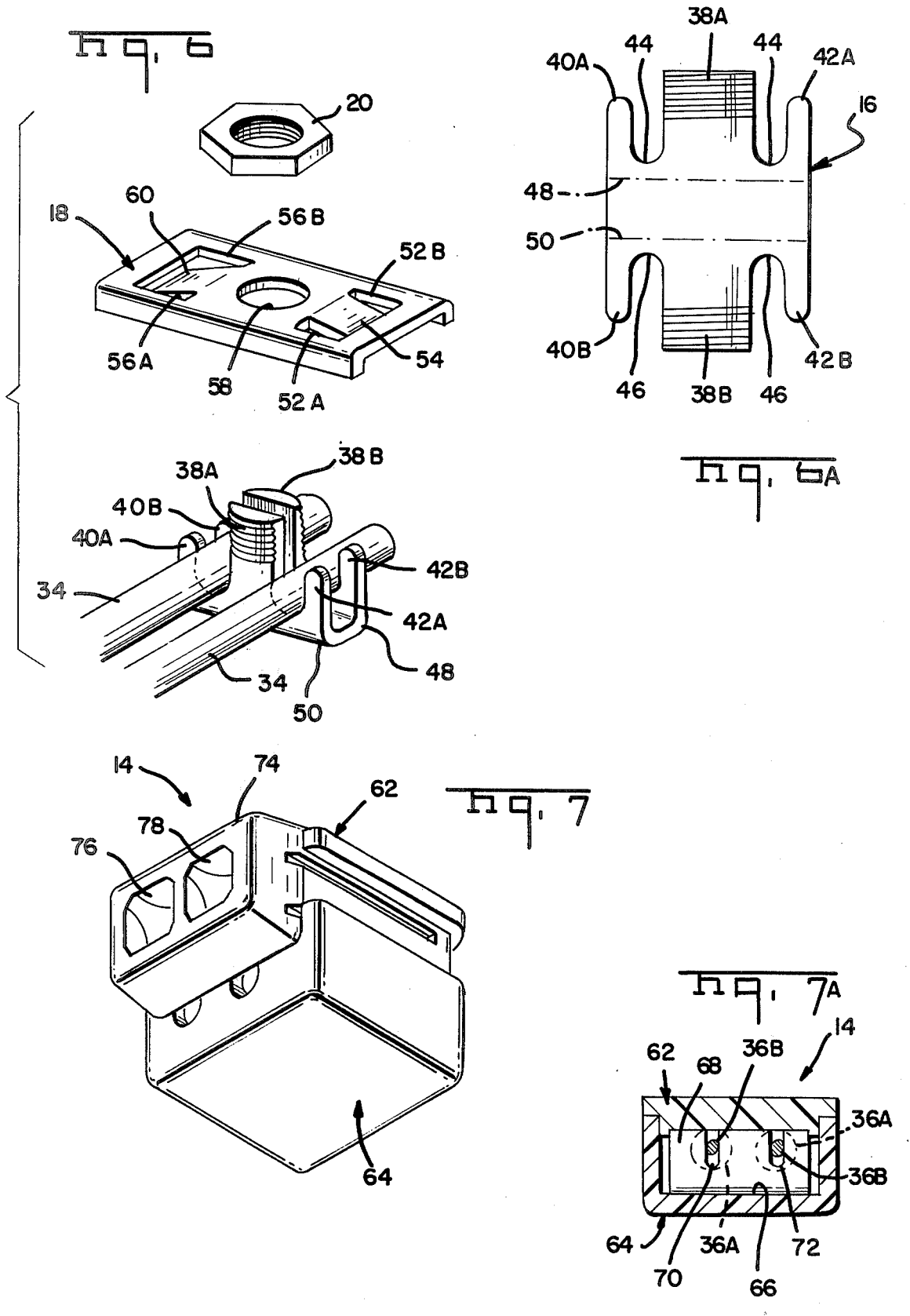

SEALED SPLICE

FIELD OF THE INVENTION

The invention relates to a sealed electrical splice, and, more particularly, to an environmentally sealed electrical connector for covering and protecting exposed portions of electrically joined wires.

BACKGROUND OF THE INVENTION

An electrical wire splice which is underground requires special considerations for covering and protecting the exposed portions of the spliced wires. One recognized technique requires encapsulation of the exposed wires with a viscous sealant material, followed by containing the splice and the sealant within a rigid housing or shell. One procedure of assembly requires spooning the sealant into the connector prior to closure thereof. Such a procedure has proved to be sloppy and requires separate transport and handling of the sealant separate from the remaining parts of the splice enclosure. An improved procedure of assembly involves complete assembly of the connector portion, followed by injection of sealant into the confines of the connector through an orifice. Such a procedure requires expensive injector tools. Further, operator skill is relied upon for a determination that an adequate supply of sealant material has been injected. Since the connector is fully assembled prior to injection of the sealant, sealant voids within the connector are difficult to detect and fill.

BRIEF DESCRIPTION

According to the present invention, an environmentally sealed connector is provided with a volumetrically collapsable container initially filled with a precisely measured quantity of sealant. The connector is assembled over the electrical splice, with the sealant filled container located in the connector so that it opens toward the splice. An outer shell of the connector is compressibly closed on the container, collapsing the same to expel the sealant and to distribute the same throughout the interior of the connector shell. The requirement for separate handling of the sealant material is eliminated. The quantity of sealant material in the container is precisely metered and thereby assures sufficient sealant to fill the interior of the connector shell. By strategically locating the splice near or within the collapsable container, the sealant material may be urged to flow over and encapsulate the component parts of the splice contained within the shell and eliminate any voids within the shell.

OBJECT OF THE INVENTION

An object of the present invention is to provide an environmentally sealed connector which is self-sealing upon assembly thereof.

Another object of the present invention is to provide a self-sealing electrical connector, in the form of a connector shell adapted to receive electrically joined conductors therein, together with a volumetrically collapsable container, which is initially filled with a viscous sealant and which is volumetrically collapsed upon assembly of the connector shell to contain the spliced conductors and to expel sealant from the container and completely encapsulate the contained splice.

Other objects and advantages of the present invention will become apparent from the following detailed description taken in conjunction with the accompanying drawings.

DESCRIPTION OF THE DRAWINGS

FIG. 2 is a perspective similar to FIG. 1 illustrating a splice of electrical conductors to be covered and sealably contained within the connector shown in FIG. 1.

FIG. 3 is an enlarged perspective in quarter section, illustrating partial assembly of the connector, shown in FIGS. 1 and 2, prior to complete closure of a shell of the connector and distribution of sealant material to sealably encapsulate the splice.

Figure 4:
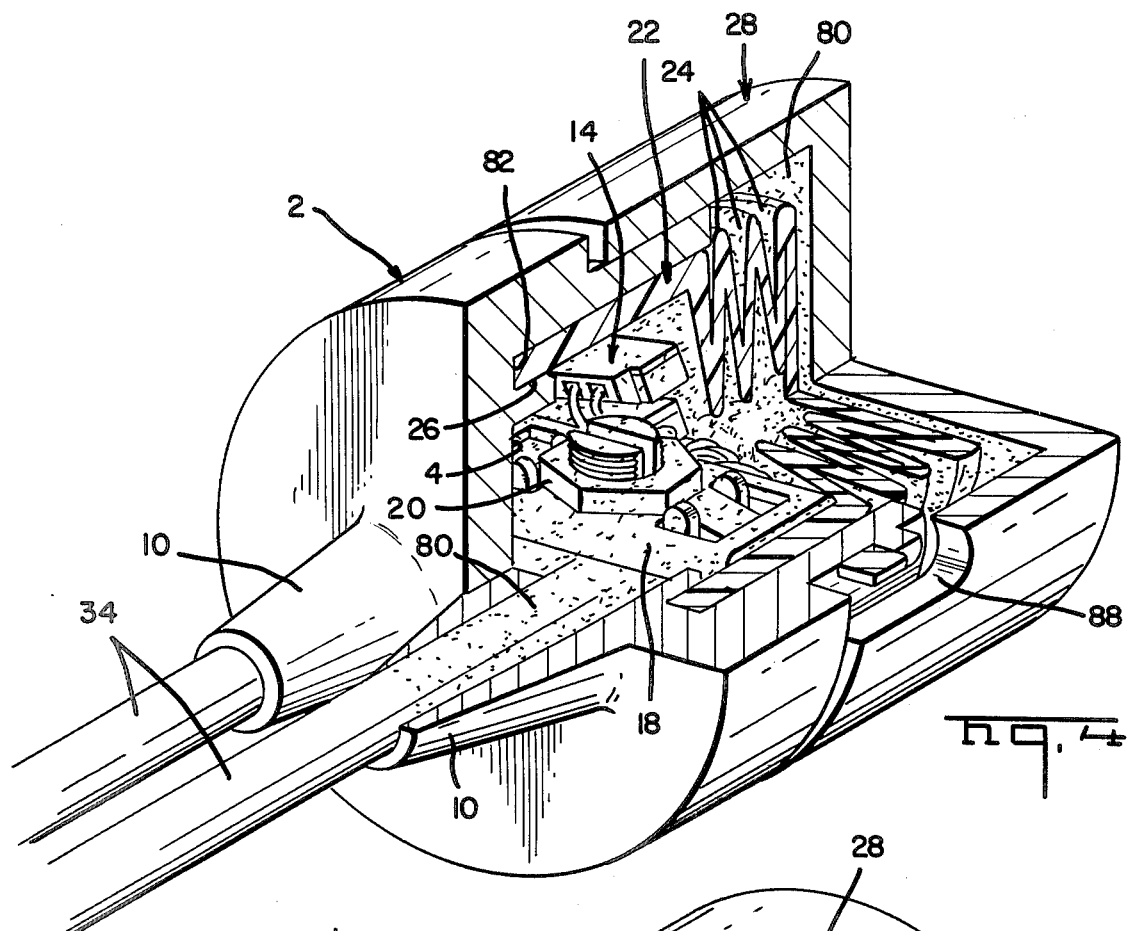
Figure 5:
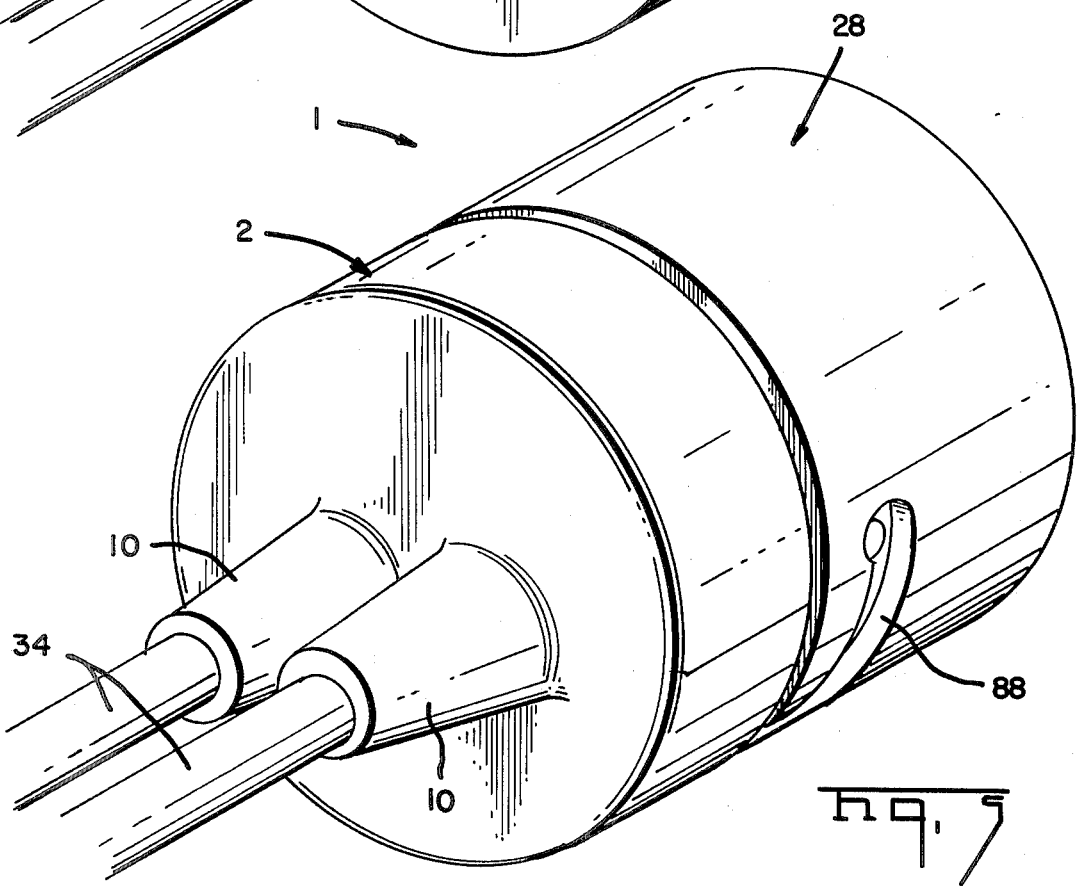

Each of FIGS. 4 and 5 is an enlarged perspective of a completely assembled self-sealing connector, with FIG. 4 in quarter section to illustrate the component parts thereof.

Figure 1:
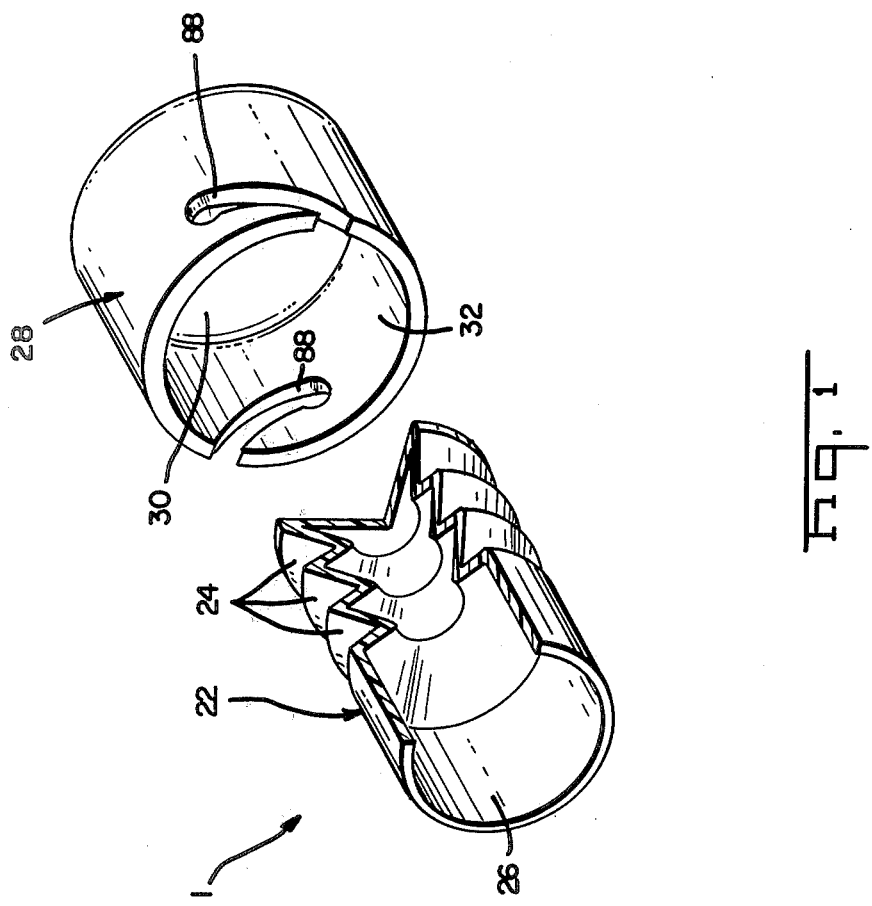
FIG. 1 is a perspective in quarter section of a self-sealing connector according to the present invention with component parts thereof in exploded configuration to illustrate the details thereof.

FIG. 6 is an elevation in section of a strain relief and grounding clamp for the conductors to be spliced in the connector as shown in FIGS. 1 and 2.

FIG. 6A is a flat metal blank of the strain relief and grounding clamp shown in FIG. 6.

Figure 7:
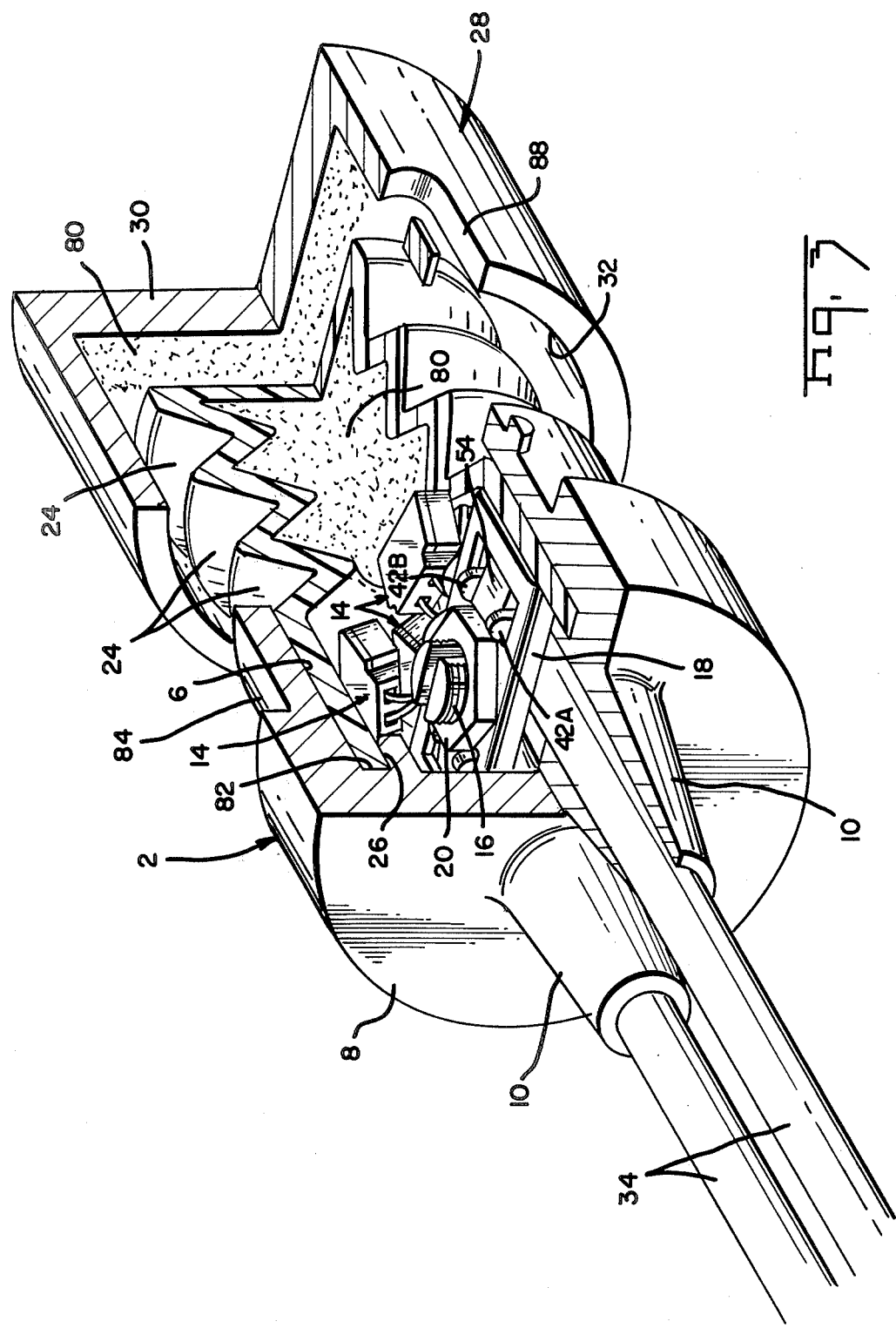

FIG. 7 is a perspective of a slotted plate connector for joining electrical conductors within the confines of the connector as shown in FIGS. 1 and 2.

FIG. 7A is an elevation in section of the connector shown in FIG. 7.

DETAILED DESCRIPTION

With more particular reference to FIG. 1, the component parts of a connector according to the present invention are shown generally shown at 1. The connector includes a molded rigid dielectric connector shell having a conductor receiving section 2, which includes an interior cavity 4 open at one cylindrical end 6 and closed at the other end by an integral end wall 8. A plurality of sleeve form boots 10 are integral with the end wall 8 and have open passageways 12 communicating with the cavity 4.

The cavity 4 is adapted to contain a plurality of conductor splicing connectors generally shown at 14, which will be described in detail hereinafter. The cavity 4 further is adapted to contain a clamp having a base plate 16 and a clamping plate 18 secured together by a threaded nut 20 for electrically terminating a shield of the cables 34. Details of the clamp will be discussed hereinafter.

Yet with reference to FIG. 1 the connector 1 further includes a sealant carrying receptacle or container 22 having a plurality of integral bellows sections 24, which communicate with one another and which are volumetrically collapsable to expel sealant through an open end 26 of the container 22 into the connector shell portion 2. Further, the connector 1 includes a closure cap section 28 molded from rigid dielectric and provided thereby with a closed end wall 30 and opposite, open end 32 which is adapted to be coupled to the section 2 of the shell.

With more particular reference to FIGS. 2 and 6, a pair of elongated cylindrical cables 34 include multiple wire conductors 36 which are to be spliced together. End portions of the cables 34 are inserted and along corresponding sleeve boots 10 of the connector shell section 2. The cables first are clamped together by the clamp 16. The individual wire conductors 36 of the cable are spliced together by the splicing connectors 14.

FIG. 6A illustrates the clamp 16 initially in the form of a flat metal strip which is subjected to stamping and forming operations to provide opposed central post sections 38A and 38B, each flanked by shorter post sections 40A and 40B and 42A and 42B. Each of the center posts 38A and 38B is separated from corresponding flanking posts 40 and 42 by open ended slot portions 44 and 46, respectively. Further, the broad surfaces of posts 38A and 38B may be indented to form raised thin ridges which may threadably receive thereover the nut 20. More particularly, the posts 38A and 38B may be formed partially into an arcuate configuration. Then the entire blank may be folded along the lines 48 and 50 to form a channel configuration, as shown in FIG. 6, with the posts 42 opposing each other, the posts 38 opposing each other and the posts 40 opposing each other. The cables 34 are inserted into the slots 44 and 46 of the clamp 16 as shown in FIG. 6. The pressure plate 18 includes a central aperture 58. The pressure plate includes further a pair of slots 52A and 52B, having an integral depending cantelever finger 54, therebetween. The corresponding slots 52A and 52B receive the posts 42A and 42B, with the finger 54 entering between the posts 42A and 42B and engaging the corresponding cable 34. In similar fashion, the plate 18 includes a pair of slots 56A and 56B with a cantelever finger 60 therebetween. The slots 56A and 56B receive corresponding post 40A and 40B, with the finger 60 entering between the posts 40A and 40B and engaging a corresponding cable 34. The nut 20 is threadably received over the posts 38A and 38B, threadably adhering to the ridges formed thereon. The nut is threadably advanced along the posts 38A and 38B engaging and urging the pressure plate 18 against the cables 34. The fingers 54 and 60 compressibly urge the cables 34 toward the bottoms of the slots 44 and 46, causing the cables 34 to be compressibly gripped by the sides of the slots 44 and 46 which are defined by the central posts 38 and the flanking posts 40 and 42. If the cables include a conductive sheath of metal foil, the foil is first exposed by stripping away an outer jacket of the cable which might be present. The exposed sheath may then be compressibly gripped by the sides of the slots electrically grounding the sheaths of the cables to the clamp 16 and thereby to each other.

FIGS. 7 and 7A illustrate an exemplary connector 14 which includes an upper housing portion 62, fabricated by molding an insulative plastics material, and a cooperating second plastic housing portion 64, also molded, having an internal cavity 66 in which is mounted a metal plate 68 having open ended slots 70 and 72. The housing portion 62 includes an integral projecting, relatively thick end wall 74 having multiple openings therethrough 76 and 78. Initially, individual insulation covered wires 36 of the cables 34 are inserted into the openings 76 and 78. The ends of the wires are thereby in registration within the housing portion 62. Initially, the housing portion 64 and the electrical plate contact 68 is in spaced relationship from the housing portion 62 and the wires 36. The connector 14 is closed over the wires 36 by pressing the housing portions 62 and 64 toward each other until they abut as shown in FIG. 7A. The contact slots 70 and 72 then will receive corresponding wires 36 therein and will slice through the insulation of the wires, shown in phantom outline at 36A. The sides of the contact slots will wedgingly engage opposite sides of the conductors 36B of the wires, thereby electrically connecting them together with the plate 68.

FIG. 2 additionally shows the container 22 having at least its bellows sections 24 filled with a suitable viscous waterproof encapsulent material 80. The container 22 may be received internally of the closure cap portion 28 which also may contain a quantity of the sealant material 80 along its bottom wall 30 thereof. The shell portion 2 as shown in FIG. 2 is slideably advanced along the conductors 34 until the clamp 16 and the splicing connectors 14 are received within the internal cavity 4.

As shown more particularly in FIG. 3, the open end 32 of the container is inserted within the open end 6 of the shell section 2, the cylindrical wall of the container encircling the open end 32 thereof being interfitted within a concentric groove provided in the interior of the end wall 8. Thus the open end 26 of the container receives the clamp 16 and the splicing connectors therein. Further, the container is concentrically received within the shell section 2, with the wall of the container seated within a groove of the shell section 2.

By reference to FIGS. 3 and 4, the closure cap 28 is then advanced, by hand pressure against the end wall 30, toward the shell section 2. The cap 28 thereby is received over the bellows sections 24 and applies pressure thereto, collapsing the bellows sections and expelling the viscous sealant therein. The closure cap 28 is advanced along a reduced diameter portion 84 which encircles the open end 6 of the container 2. Projecting outwardly of the portion 84 are one or more pins or bayonets 86 which may be molded integral with the shell section 82. Each pin 86 is received within a corresponding slot 88 provided in the wall encircling the open end 26 of the closure cap 28. The pin 86 and slot 88 cooperate to form a bayonet coupling for connecting the cap 28 in its fully closed position over the container and over the reduced diameter portion 84.

FIGS. 4 and 5 illustrate a fully assembled connector shell. The sealant 80 expelled from the collapsed bellows sections 24 completely fills the interior 4 of the shell section 2 and also the interior of the container adjacent the open end 26 thereof. Additionally the sealant 80 is expelled under pressure created by collapse of the bellows section 24, causing the expelled sealant to flow forcefully about the strain relief clamp 16 and the connectors 14 as well as the exposed wire conductors of the cables 34 which are spliced together. Pressure exerted on the expelled sealant also will cause the sealant to flow in and along the boots 10 to sealably encircle the cables 34. Additional sealant will flow into the groove 82 to seal the interface of the shell section 2 and the open end 26 of the container 22. Considerable pressure may be required to expel the sealant and to fill all voids within the connector shell and to encapsulate the spliced conductors and the strain relief 16 and the connectors 14. Therefore it becomes necessary to augment the hand pressure when closing the closure cap 28 over the shell section 2. Accordingly, the bayonet coupling slots 88 may be provided helically along the closure cap 28, requiring the closure cap to be rotated as it is being assembled to the shell section 2. Such rotation will cause a helical advance or a threadable advance of the closure cap as it is being assembled. The threadable assembly therefore augments the hand pressure and insures the requisite amount of pressure required to distribute the sealant 80 as desired.

Although a preferred embodiment of the present invention has been described and illustrated, other embodiments as well as modifications thereof are intended to be covered by the spirit and scope of the claims.

What is claimed is:

1. A connector having an interior which is self-sealing by distribution of sealant material, comprising:
   a connector shell having an interior cavity and wire receiving openings through the exterior of said shell which communicates with said cavity,
   said cavity having a wire receiving section for receiving a plurality of wires passing through said openings to be electrically joined within said cavity,
   said cavity having another section containing a volumetrically collapsable container filled with a fluid sealant material, and
   means for closing said connector shell compressibly over said wires and said container and for volumetrically collapsing said container to expel said sealant and distribute the same throughout the cavity.

2. The structure as recited in claim 1, wherein, each said wire receiving opening includes a sleeve form boot integral with said shell,
   said boots opening into said wire receiving cavity section to receive quantities of said sealant expelled from said container.

3. The structure as recited in claim 1, wherein, said container is of hollow bellows configuration having an opening facing said wire receiving section of said shell, said shell having coupling means for advancing said shell sections toward each other to collapse said bellows configuration and expel the sealant.

4. The structure as recited in claim 3, wherein, said opening of said container is concentrically received within said wire receiving section to concentrically encircle a plurality of wires to be electrically joined within said cavity.

* * * * *